United States Patent
Clawson et al.

(10) Patent No.: US 11,807,233 B1
(45) Date of Patent: Nov. 7, 2023

(54) PROCEDURALLY GENERATED SAFETY SYSTEM DETERMINATION

(71) Applicant: Zoox, Inc., Foster City, CA (US)

(72) Inventors: Taylor Clawson, Foster City, CA (US); Leonardo Poubel Orenstein, San Mateo, CA (US); Sy Kelly Olson, Oakland, CA (US)

(73) Assignee: Zoox, Inc., Foster City, CA (US)

( * ) Notice: Subject to any disclaimer, the term of this patent is extended or adjusted under 35 U.S.C. 154(b) by 380 days.

(21) Appl. No.: 17/133,306

(22) Filed: Dec. 23, 2020

(51) Int. Cl.
*B60W 30/00* (2006.01)
*B60W 30/095* (2012.01)
*B60W 30/09* (2012.01)
*B60W 60/00* (2020.01)

(52) U.S. Cl.
CPC ........ *B60W 30/0956* (2013.01); *B60W 30/09* (2013.01); *B60W 30/0953* (2013.01); *B60W 60/0015* (2020.02); *B60W 2554/4041* (2020.02); *B60W 2554/4042* (2020.02); *B60W 2554/4046* (2020.02); *B60W 2554/80* (2020.02)

(58) Field of Classification Search
CPC ......... B60W 30/0956; B60W 60/0015; B60W 30/09; B60W 30/0953; B60W 2554/4041; B60W 2554/4042; B60W 2554/80; B60W 2554/4046
See application file for complete search history.

(56) References Cited

U.S. PATENT DOCUMENTS

| | | | |
|---|---|---|---|
| 11,577,741 B1* | 2/2023 | Reschka | B60W 50/045 |
| 2018/0141544 A1* | 5/2018 | Xiao | B60W 30/09 |
| 2018/0208192 A1* | 7/2018 | Olsson | B60W 30/09 |
| 2018/0225971 A1* | 8/2018 | Foltin | G08G 1/166 |
| 2019/0152490 A1* | 5/2019 | Lan | B60W 50/0097 |
| 2019/0303759 A1* | 10/2019 | Farabet | G06N 3/08 |
| 2020/0239029 A1* | 7/2020 | Kim | B60W 60/0059 |
| 2021/0300352 A1* | 9/2021 | Newman | B60W 30/09 |
| 2022/0105963 A1* | 4/2022 | Costa | B60W 60/00274 |
| 2022/0250617 A1* | 8/2022 | Lindberg Nilsson | B60W 30/0956 |

FOREIGN PATENT DOCUMENTS

WO    WO2022072172 A1 *  1/2020  ............ B60W 30/08

OTHER PUBLICATIONS

J. Kim, "Collision Risk Assessment Algorithm via Lane-Based Probabilistic Motion Prediction of Surrounding Vehicles", 2018 (Year: 2018).*

Fraichard et al., "Inevitable collision states—a step towards safer robots?" Advanced Robotics, Taylor & Francis, 2004, 18, 18 (10), pp. 1001-1024. ?inria-00182063v1?

* cited by examiner

*Primary Examiner* — Elaine Gort
*Assistant Examiner* — Brittany Renee Peko
(74) *Attorney, Agent, or Firm* — Lee & Hayes, P.C.

(57) ABSTRACT

Techniques for procedurally generating scenarios that verify and validate predictions from or operation of a vehicle safety system are discussed herein. Sensors of a vehicle may detect one or more objects in the environment. A model may determine intersection values indicative of probabilities that the object will intersect with a trajectory of the vehicle. A vehicle may receive one or more intersection values from a model usable by a computing device to validate a prediction from a vehicle safety system.

20 Claims, 6 Drawing Sheets

PROCEDURALLY GENERATED SAFETY SYSTEM DETERMINATION

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment, which enables the planning systems to determine an effect of a detected object on a potential action for the vehicle. However, the complexity of such systems may cause preclusion of inspecting the reliability of such systems, especially as applied in ever more complicated scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
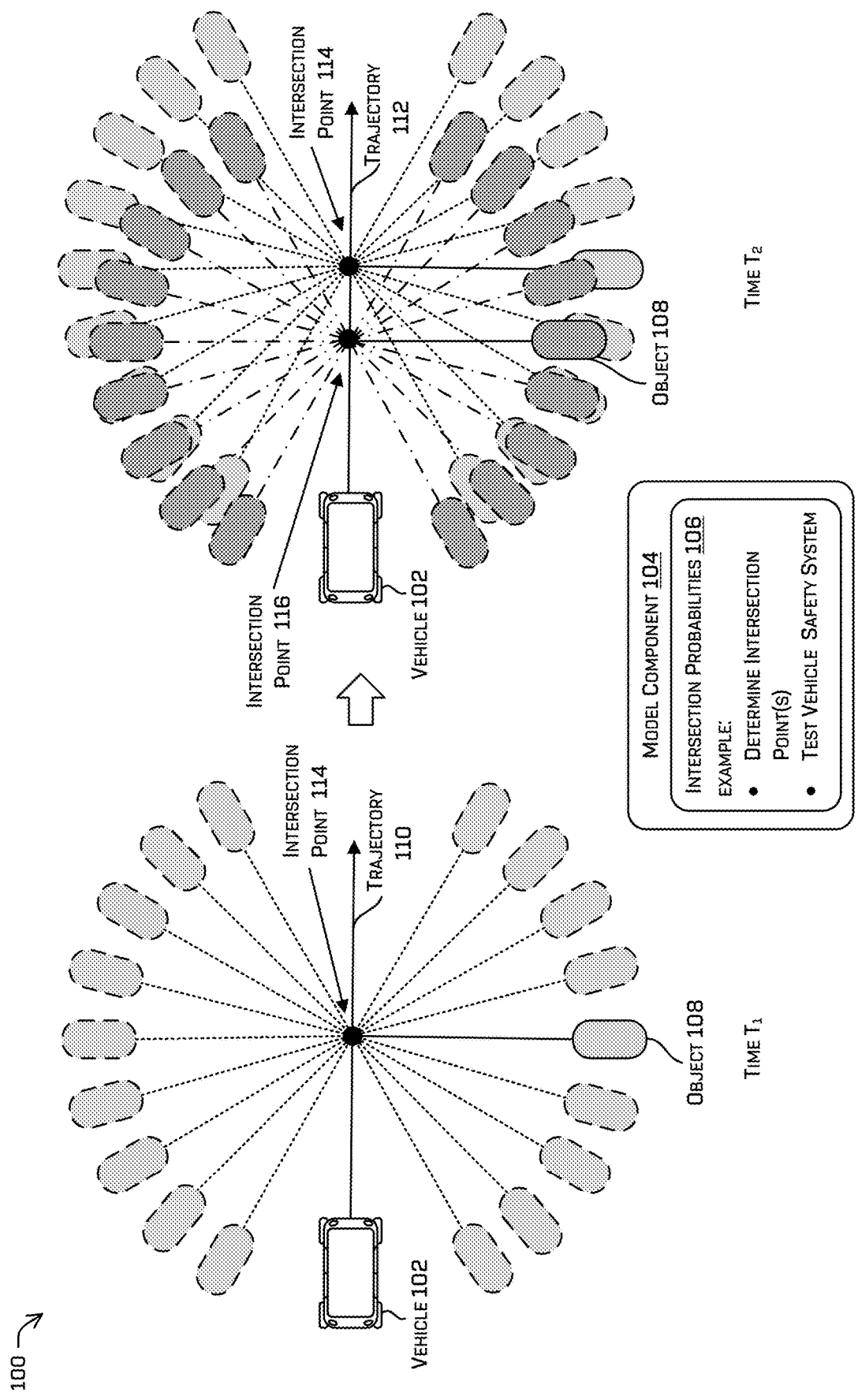
FIG. 1 is an illustration of an example environment, in which an example vehicle applies a model to predict an intersection value indicating a likelihood for collision with one or more example objects.

This disclosure relates to techniques for procedurally generating scenarios that verify and validate predictions from a safety system associated with a complex device, such as an autonomous vehicle. For instance, a model may receive data representing object information (a current orientation and/or speed of the object, one or more predicted trajectories and/or speeds of the object) and/or vehicle information (e.g., a current trajectory of the vehicle, a current speed of the vehicle, etc.). The model may also receive input data identifying how likely the object is to move towards or away from the vehicle and/or how likely the object is to speed up or slow down relative to the vehicle. The model can employ procedural generation techniques to output data indicating intersection probabilities between the vehicle and the object at different locations in the environment at a future time. Using the techniques described herein, intersection probabilities from a model can be used to verify and/or validate predictions from the vehicle safety system to improve accuracy of the vehicle safety system, including quickly verifying that a trajectory of the vehicle will not result in an intersection with an object, thereby improving safety of the vehicle. Further, such techniques may allow such a complex system to explore a larger parameter space while maintaining a high level of safety.

Generally, the model may provide functionality to generate data representing scenarios or interactions between a vehicle and potential objects in an environment in the future. For example, the model can procedurally generate output data that represents multiple scenarios, and provide the output data to a vehicle safety system to test predictions made by the vehicle safety system. Data input into the model can represent how an object may behave (e.g., is likely to accelerate, turn direction quickly, and so on), and may be based on an input from a user interface (e.g., be user-specified) and/or a machine learned model. The model can output probabilities for an intersection between the object and the vehicle in different areas of the environment. Accordingly, the model can be used to generate data usable for determining accuracy of vehicle safety system predictions.

In some examples, the model can be used to model behavior of a vehicle controller with respect to objects in various regions of an environment. A region proximate a vehicle can be associated with a first region in which a collision with an object in an environment is inevitable regardless of how evasive either vehicle (e.g., based on motion of a vehicle), a second region in which a collision with an object may occur based on a behavior of the object, and a third region in which a vehicle may stop before any potential collision. The regions proximate the vehicle can be based at least in part on the conditions of the vehicle (e.g., speed, braking ability, etc.), conditions of an object (e.g., initial position, initial velocity, initial heading, turning rate(s), acceleration rate(s), etc.), and the like. In some examples, a behavior of the object can be evaluated with respect to an adversarial control profile, in which the object can be modeled to cause a collision based on the capability of the object. Such an adversarial control profile can be based on captured driving data, testing data, empirical data, kinematic/dynamic modeling, and the like. Further, a behavior of an object can be determined with respect to a likelihood of an object to avoid a collision (e.g., an "evasiveness parameter") and may be determined based on driving data or other techniques discussed herein. As the three regions proximate the vehicle are determined, the regions and initial conditions can be sampled and used to instantiate a model to evaluate operation of a vehicle controller. In some examples, the first region (e.g., where a collision is guaranteed) and/or the third region (e.g., where a vehicle may avoid a collision against an adversarial object) can be excluded from modelling to reduce a complexity of collision estimation and validation.

In some examples, the model can receive, as input data, object state data associated with an object in an environment proximate a vehicle. For instance, the object state data may comprise one or more of a position, a heading, a speed, a velocity, an acceleration, or a trajectory of the object at a current time (e.g., a first time). The model can also or instead receive a position and/or an orientation of the vehicle at the current time as well as a trajectory for the vehicle to follow at a future time (e.g., a second time). In various examples, the model can receive a parameter describing a behavior of the object in the future such as an evasiveness parameter indicating a likelihood for the object to slow down and/or move away from the vehicle or an aggressiveness parameter indicating a likelihood for the object to speed up and/or move towards the vehicle. Thus, the model can receive, as input data, a combination of data representing the object state, the vehicle state, and the object behavior.

In some examples, the model can determine input data relative to a trajectory of the vehicle. Further, in some examples, a vehicle safety system may determine whether to execute a safe-stop trajectory (e.g., maximum deceleration along the trajectory) based on current state of an environment. That is, the vehicle safety system may operate independent of object tracks or historical data. In such an example, large numbers of scenarios (e.g., virtually infinite real-world scenarios) can be represented by instantaneous conditions of a vehicle and an object in an environment, which greatly reduces the complexity of validating safety cases for interacting in an environment.

In various examples, the input data can represent multiple scenarios between the object and the vehicle such as whether positions associated with the vehicle and the object relate to a roadway with a single lane, multiple lane, four-way-stop, and so on. The input data can also or instead represent scenarios in which the object is subject to traffic laws (e.g., a stop sign, stop light, right of way, etc.), whether the object is turning quickly (e.g., swerving), turning left or right, or changing acceleration. Further, the input data can be associated with scenarios independent of whether the object is identified by object type (e.g., a pedestrian, another vehicle, a bicycle, just to name a few). Importantly, map data describing roadways, street signs, lanes, speed limits, traffic direction, etc. need not be provided as input data to the model for the model to predict intersection probabilities between the object and the vehicle. As a result of omitting the map data as input, the model can produce output data more quickly (versus processing the map data) that captures scenarios that typically require map data for processing. Thus, in some examples, the model can also process more input data leading to a greater number of predicted intersection probabilities.

In some examples, the model can process the input data using procedural generation techniques to generate output data indicating an intersection probability between the object and the vehicle in the future. In various examples, the model can predict intersection probabilities for different areas in the environment, such as an area where an intersection between the object and the vehicle is certain (though the vehicle can determine an action to avoid the intersection), an area where an intersection between the object and the vehicle is possible, or an area where an intersection is not possible. Based on the intersection probabilities associated with the different areas, the model may predict object states (e.g., a change in the velocity or a change in the orientation between the first time and the second time) that can cause the object to intersect with the vehicle and/or cause the object to not intersect with the vehicle.

The model can send the output data to a vehicle safety system which can process the output data (e.g., execute the output data as a script, perform one or more of: a simulation, an estimated state, interaction modeling, or collision estimation, and so on) to make safety predictions such as identifying potential collisions between the vehicle and the object (e.g., collisions associated with the scenarios represented by the input data). In various examples, the model can compare, as a comparison, a prediction from the vehicle safety system to the output data from the model and/or to another prediction by the vehicle safety system that is not based on the output data, and validate or otherwise assess accuracy of the vehicle safety system predictions, based at least in part on the comparison.

By providing a model that procedurally generates data to represent different potential driving scenarios using relatively simple data (e.g., object and vehicle data, and not necessarily map data), predictions from a vehicle safety system can be validated and/or verified thereby improving safety of the vehicle. For example, a vehicle computing device can validate an object behavior such as whether or not the object turned sharply towards and/or away from the vehicle over time. The vehicle computing device may also or instead validate an output by the vehicle safety system including assessing whether or not the vehicle safety system reacted to scenarios accurately (e.g., maximizing true positive and true negative predictions and/or minimizing false positive and false negative predictions). In some examples, an output from the model can be used by the vehicle computing device to verify operation of algorithms associated with the vehicle safety system (e.g., verifying operation of a prediction algorithm, a filtering algorithm, or an intersection probability algorithm to a predetermined accuracy).

In some examples, techniques for predicting and avoiding collisions as described herein can be implemented as part of a vehicle safety system running on a resource constrained platform (e.g., processor and/or memory capacity is limited). In such examples, the model can perform multiple separate operations that are relatively easy to calculate (e.g., predicting probabilities that the object will intersect the vehicle in different areas of the environment), and determine probabilities of a collision with an object at possible intersection locations and/or times. For instance, a model may be implemented to test whether the vehicle safety system can avoid colliding with an object that is highly evasive or adversarial (e.g., as determined by an evasiveness parameter or an aggressiveness parameter), within a certain distance of the vehicle, and moving towards the vehicle at a set acceleration, for instance.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine state data usable by the model to predict potential for an intersection with the object along a path.

In some examples, the vehicle may comprise a vehicle safety system implemented separately from the vehicle computing device for improved performance of the vehicle safety system, and/or to provide redundancy, error checking, and/or validation of determinations and/or commands determined by the vehicle computing device. However, in other examples, the vehicle safety system may be implemented as one or more components within the same vehicle computing device.

By way of example, the vehicle computing device may be considered to be a primary system, while the vehicle safety system may be considered to be a secondary system. The primary system may generally perform processing to control how the vehicle maneuvers within an environment. The primary system may implement various artificial intelligence (AI) techniques, such as machine learning, to understand an environment around the vehicle and/or instruct the vehicle to move within the environment. For example, the primary system may implement the AI techniques to localize the vehicle, detect objects around the vehicle, segment sensor data, determine classifications of the objects, predict object tracks, generate trajectories for the vehicle and the objects around the vehicle, and so on.

In some examples, the vehicle safety system may operate as a separate system that receives state data (e.g., perception data) based on the sensor data and AI techniques implemented by the primary system (e.g., vehicle computing device), may determining state data independently from sensor data, and may perform various techniques described herein for improving collision prediction and avoidance by the vehicle.

As described herein, models may be representative of machine learned models, non-machine learning models, or a combination thereof. That is, a model may refer to a machine learning model that learns from a training data set to improve accuracy of an output (e.g., a prediction). Additionally or alternatively, a model may represent logic and/or mathematical functions that generate approximations which are usable to make predictions.

In some examples, the vehicle safety system may determine state data associated with the object at a current time (e.g., a first time). For example, state data may comprise one or more of: position data, orientation data, heading data, velocity data, speed data, acceleration data, yaw rate data, or turning rate data associated with the object. In various examples, the vehicle safety system may determine one or more possible headings of the object based on the yaw rate data. In various example, the vehicle safety system may predict a change in the state data (e.g., a change in acceleration and/or turning rate over time) required to cause an intersection with the vehicle. In such examples, the vehicle safety system may receive sensor data from one or more sensors of a vehicle, and determine the state data based at least in part on the sensor data.

By way of example and not limitation, to enable the vehicle to respond quickly and accurately to objects, the vehicle safety system employ a model to determine intersection information (e.g., intersection probabilities indicative of how likely the object is to intersect with the vehicle, likely areas of intersection, etc.) to a planning component configured to plan a trajectory for the vehicle and/or to a perception component configured to sense the environment. In this way, intersection probabilities from the model can be considered during planning operations (e.g., to avoid the object) and/or to during perception operations (e.g., to direct one or more sensors to capture higher levels of perception for objects most likely to cause an intersection relative to another object).

The intersection probabilities output by a model may be used in a variety of ways. For instance, one or more values from the model may be used by a vehicle computing device to determine a vehicle action (e.g., control the vehicle, adjust a sensor, determine perception data, and so on). In some examples, controlling the vehicle may comprise stopping the vehicle, determining a trajectory for the vehicle to follow in the environment, and/or controlling at least one of: a braking system, an acceleration system, or a drive system of the vehicle.

A vehicle computing system may allocate an amount of memory, a type of memory, and/or a memory location to make the best use of available memory resources to models that predict possible collisions between object(s) and/or vehicles. In some examples, models may make use of memory resources that are remote from the vehicle (e.g., a remote server or a remote vehicle).

In some examples, a model may define processing resources (e.g., processor amount, processor cycles, processor cores, processor location, processor type, and the like) to use to predict whether an object path will likely intersect with the vehicle. A vehicle computing system that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict intersection probabilities by processing the object using a GPU, CPU, or a combination thereof. In this way, each model may be defined to utilize the processing resources that enable the model to perform predictions in the least amount of time (e.g., to use the intersection values in planning considerations of the vehicle). Accordingly, models may predict intersections to make the best use of available processing resources and enable more predictions that may improve how a vehicle navigates in relation to the objects.

The techniques discussed herein can improve a functioning of a computing device of a vehicle in a number of ways. For example, the model may act as an attention system (e.g., a vehicle safety system and/or a redundancy to an existing perception component) that identifies potential objects that may intersect with the vehicle. In some examples, the attention system may be separate from a main vehicle computing device (e.g., the model may be included as part of a vehicle safety system 534 independent of vehicle computing device 504). The techniques can include the model optimizing available computational resources by performing operations that limit the impact on the available resources (as compared to not implementing the model). In some examples, determining region(s) proximate a vehicle based on an adversarial object and/or based on object behavior and vehicle capabilities can reduce a search space for modelling and validation. Utilizing intersection probabilities by a vehicle computing device, for instance, can improve the accuracy and/or reduce a latency for the vehicle to respond to a potential collision in the environment, thereby improving the safe operation of the vehicle in complex environments.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an autonomous vehicle (vehicle 102) in an environment 100, in which an example intersection model (model component 104) may determine intersection probabilities (intersection probabilities 106). A vehicle computing device (e.g., vehicle computing device 504 and/or the computing device(s) 550) and/or a vehicle safety system (e.g., vehicle safety system 534) may implement the intersection model of the vehicle 102. While described as a separate system, in some examples, intersection prediction techniques described herein may be implemented by other vehicle systems, components, and/or computing devices. For example, and as will be described in further detail with regard to FIG. 5, the intersection prediction techniques described herein may be implemented at least partially by or in association with a localization component 520, a perception component 522, and/or a planning component 524.

In various examples, the vehicle safety system may be configured to determine or receive a plurality of object states (e.g., object state data) associated with object(s) in the environment 100. For instance, the model component 104 may receive sensor data, such as via a perception component (e.g., the perception component 522), and determine object state data based at least in part on the sensor data. In some examples, the object state data can represent a single value, a minimum value and/or a maximum value associated with one or more of: a heading, a speed, a velocity, a trajectory, a turn rate for a given speed, just to name a few. In some examples, the vehicle safety system may detect, infer, estimate, or otherwise determine state data representing characteristics of the object in the environment 100. In some examples, the sensor(s) may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other autonomous vehicles. The data may include sensor data and/or state data, such as object state data and vehicle state data.

In some examples, the model component 104 may determine the plurality of object states based at least in part on an adversarial behavior associated with the object. For instance, one or more object states in the plurality of object states can represent a behavior of the object such as a pedestrian running at a maximum velocity in a direction towards the vehicle 102. Combinations of object states can, for instance, indicate whether the pedestrian intends to approach the vehicle 102 with a high rate of speed which will cause a collision. Such models become more complex when limiting adversarial behavior to an initial orientation of the object and dynamic/kinematic constraints (e.g., minimum turning radius, maximum turning rate, etc.).

In some examples, the vehicle safety system may be configured to detect one or more objects in the environment 100, such as object 108. In some examples, the vehicle safety system may be configured to receive, detect, infer, estimate, or otherwise determine the intersection probabilities 106 indicating a likelihood that the vehicle 102 and the object 108 intersect along a trajectory 110 at an intersection point 114 at time $T_1$, and a likelihood that the vehicle 102 and the object 108 intersect along a trajectory 112 at an intersection point 116 at time $T_2$. As shown in FIG. 1, at time $T_1$, the object 108 can be associated with different positions, headings, speeds, and/or velocities. For instance, for a given object position, heading, and/or velocity, the model component 104 can determine the intersection point 114 and the intersection point 116. As described further in FIG. 2 and elsewhere, the intersection probabilities 106 determined by the model component 104 can also or instead represent a likelihood that an intersection is associated with an area or region in the environment.

In some examples, the model component 104 may receive parameter information (e.g., an evasiveness parameter and/or an aggressiveness parameter) associated with the object 108, and in such examples the intersection probabilities 106 can be determined based on the parameter information. In some examples, the evasiveness parameter associated with the object may indicate a likelihood for the object to move away from the vehicle or slow down relative to the vehicle from the first time to the second time. In some examples, the aggressiveness parameter associated with the object may indicate a likelihood for the object to move towards the vehicle or speed up relative to the vehicle from time $T_1$ to $T_2$.

In some examples, a vehicle computing device may control the vehicle 102 in the environment based at least in part on the intersection probabilities 106. For instance, the model component 104 may provide functionality of an attention system for the vehicle 102 by determining an output indicating a likelihood of an intersection and using the output to test, verify, and/or validate another prediction by the vehicle computing device, such as a prediction from a primary artificial intelligence (AI) computing device. Accordingly, the intersection probabilities 106 may be taken into account in operations (e.g., simulations, estimated states, interaction modeling, collision estimation, etc.) or other vehicle control planning operations (a planning component of the vehicle computing device may receive instructions from the model component 104 for use in planning operations). In some examples, controlling the vehicle 102 may comprise controlling at least one of: a braking system, an acceleration system, or a drive system of the vehicle (e.g., vehicle 502).

In at least one example, the vehicle safety system may determine the intersection probabilities 106 based at least in part on a trajectory (e.g., direction, speed, acceleration, etc.) associated with the vehicle 102. For instance, a planning component (e.g., the planning component 524) may send a planned trajectory of the vehicle 102 (e.g., the trajectory 110 for time $T_1$ and the trajectory 112 at time $T_2$) to the model component 104. In various examples, intersection probabilities 106 may indicate an intersection time to represent a change in time from the current time to a time associated with the trajectory of the vehicle 102 when an intersection occurs with the object. In some instances, the trajectory 110 and/or the trajectory 112 of the vehicle 102 may be represented as a series of line segments and associated with one or more positions, velocities, accelerations, or other desired states. In some examples, any one of the trajectory 110 and/or the trajectory 112 may represent a substantially straight line. However, in other examples, the vehicle safety system may determine curved paths for the trajectory 110 and/or the trajectory 112. In some examples, parameters of the object 108 can be expressed relative to a trajectory of the vehicle, so although a trajectory is illustrated as straight, it may represent any arbitrary trajectory for the vehicle 102 in an environment. Additional detail for determining and utilizing intersection probabilities 106 and determining intersection points are discussed throughout this disclosure.

In some examples, to determine the probability for an intersection, the vehicle safety system may determine points in the environment 100 at which a given state representation (e.g., a velocity) of the object 108 would cause a collision. For instance, for a particular position, the vehicle safety system may determine a velocity (e.g., an instantaneous velocity) for the object 108 to collide with the vehicle 102 based at least in part on the one or more equations of motion. In some examples, the vehicle safety system may determine object state data that causes an intersection between the object 108 and the vehicle 102, and generate data for testing the vehicle safety system according to the object state representation.

In various examples, the model component 104 can determine one or more regions based at least in part on the object state data and a trajectory (e.g., the trajectory 110 and/or the trajectory 112). In some examples, the regions can represent areas in the environment where a collision will take place, an area that a collision will not take place, and/or an area where a collision is probable (based on an intersection probability). In some examples, a region can be determined based at least in part on an evasiveness parameter or an aggressiveness parameter associated with the object. In such examples, the evasiveness parameter may represent a likelihood for the object to perform an action to decrease a possible collision associated with the vehicle, and the aggressiveness can represent a likelihood for the object to perform an action to increase a possible collision associated with the vehicle.

The model component 104 can, in some examples, initiate a simulation comprising an object having a simulated object state associated with the object state data. For instance, the vehicle computing device can initiate a simulation to test a potential object having states identified by the object state data. In some examples, the vehicle computing device can perform the simulation in a particular region or area of the environment such as in a region where a collision is probable according to an intersection probability.

The vehicle computing device may also or instead determine, based at least in part on the simulation, a response to the simulated object state by a secondary system. That is, a vehicle safety system may perform a simulation and the vehicle computing device can identify, validate, or otherwise determine whether the response by the vehicle safety system identified a vehicle action to avoid a collision with the object.

It should be understood that the intersection points in FIG. 1 are for the purpose of illustration. A different number of intersection points, intersection probabilities, and/or intersection times may be determined by the vehicle 102 for any number of objects in the environment 100. Accordingly, implementing the model component 104 can improve intersection predictions regardless of the location of the object relative to the vehicle.

Figure 2:
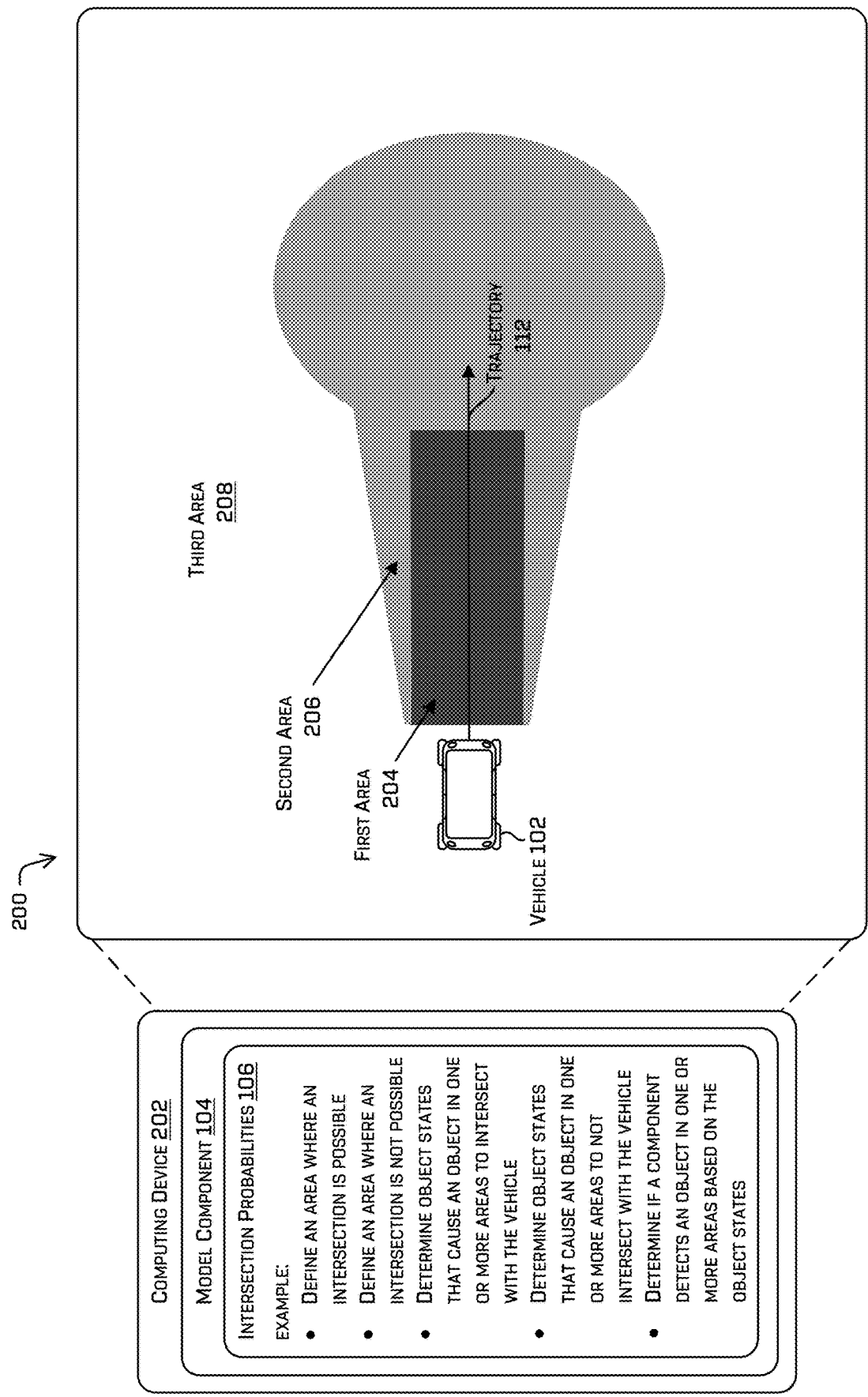
FIG. 2 is an illustration of another example environment, in which one or more models determine intersection probabilities between a vehicle and an object for different regions.

FIG. 2 is an illustration of another example environment 200, in which one or more models determine intersection probabilities between a vehicle and an object. For instance, a computing device 202 (e.g., vehicle computing device 504 and/or the computing device(s) 550) and/or a vehicle safety system (e.g., vehicle safety system 534) may implement the model component 104 to determine intersection probabilities (intersection probabilities 106) between a vehicle (vehicle 102) and an object (object 108).

FIG. 2 depicts the model component 104 determining or defining areas (e.g. a first area 204, a second area 206, and a third area 208) in the environment 200 according to input data that represents an object state and/or object behaviors. For instance, the object state data may comprise one or more of a position, a heading, a speed, a velocity, an acceleration, or a trajectory of the object. In some examples, the model component 104 can receive the trajectory 112 for the vehicle 102 to follow at a future time. In various examples, the model component 104 can receive a parameter describing a behavior of the object in the future such as an evasiveness parameter indicating a likelihood for the object to slow down and/or move away from the vehicle or an aggressiveness parameter indicating a likelihood for the object to speed up and/or move towards the vehicle. In various examples, the model component 104 can receive, as input data, a combination of data representing the object and the vehicle. The input data can, in some examples, be at least partially determined based on input from a user interface. For instance, a user or machine learned model can determine the input data (e.g., specify a turning rate, a velocity, and/or an evasiveness parameter for an object, and so on) to test for different scenarios that the vehicle safety system may process while the vehicle 102 traverses in the environment 200.

In some examples, the model component 104 can determine an intersection range between the object and the vehicle based at least in part on an object parameter. For example, the model component 104 can determine a range of distances and/or a range of times for an intersection to occur between the object and the vehicle based at least in part on the evasiveness parameter and/or the aggressiveness parameter. In some examples, data output by the model component 104 can indicate the intersection range.

In some examples, the input data can be associated with scenarios independent of whether the object is identified by object type (e.g., a pedestrian, another vehicle, a bicycle, just to name a few) and absent map data describing roadways, street signs, lanes, speed limits, traffic direction, etc. However, in some examples, an indication of object type can be used to model parameters associated with the object, such as maximum speed or acceleration, maximum turning rate, observed ability to maneuver away from an intersection, and the like.

In some examples, the model component 104 can process the input data using procedural generation techniques to generate output data comprising the intersection probabilities 106 between an object in the vicinity of the vehicle 102 in the future. For example, the model component 104 can associate one or more of the object state data, the trajectory, or the parameter with one or more procedural generation features, and procedurally generate the output data based at least in part on the one or more procedural generation features.

In various examples, the model component 104 can predict intersection probabilities for different areas in the environment, such as an area where an intersection between the object 108 and the vehicle 102 is certain (e.g., the first area 204), an area where an intersection between the object and the vehicle is possible (e.g., the second area 206), or an area where an intersection is not possible (e.g., the third area 208). In some examples, the third area 208 can represent any area not included in the first area 204 and the second area 206. Based on the intersection probabilities associated with the different areas, the model component 104 may predict object states (e.g., a change in the velocity, speed, or heading between the first time and the second time) that can cause the object to intersect with the vehicle and/or cause the object to not intersect with the vehicle. For instance, the model component 104 can determine object states that cause an object in one or more areas (e.g., areas 204, 206, and/or 208) to intersect with the vehicle 102 and/or determine object states that cause an object in the one or more areas to not intersect with the vehicle 102. In this way, the model component 104 can generate output data representing different scenarios in the environment 200.

In various examples, the intersection probabilities 106 output by the model component 104 can be precomputed and associated with a look-up table usable by a vehicle computing device to cause the vehicle to perform an action. For example, intersection probabilities for different areas in the environment can be accessed by the vehicle computing device (e.g., via the look-up table) while the vehicle 102 navigates in the environment to enable the vehicle 102 to avoid potential objects detected in the different areas. The vehicle computing device may, for example, identify, detect, or otherwise determine an area where an intersection between an object and the vehicle 102 is certain (e.g., the first area 204), and based on the object being detected in the area, determine acceleration, braking, and/or steering actions that minimize the intersection. In some examples, the intersection probabilities 106 associated with different areas can identify a velocity or a range of velocities for a potential object in a particular area (e.g., an intersection probability for an area can be dependent upon a velocity of the object in the area).

In some examples, the intersection probabilities 106 can be associated with areas having different shapes that are defined based at least in part on the object state data. In this way, the computing device 202 can define different areas to have shapes that are unique relative to each other. In some examples, the intersection probabilities 106 can be stored in tables that identify different object state data (e.g., object headings, velocities, and so on) and vehicle state data (e.g., velocity of the vehicle 102, etc.). In various examples, the tables can be accessed by a vehicle computing device to test a component of the computing device 202.

In some examples, the first area 204, the second area 206, and/or the third area 208 can be determined by the computing device 202 based at least in part on an adversarial nature of objects. For example, the second area 206 may represent a region in which an object may impact operation of the vehicle 102 (e.g., cause a collision, cause the vehicle to take an action, such as brake). In some examples, different assumptions about the adversarial nature of an object (e.g., represented by different input data) can cause different shapes of the second area 206 (or other area or region in the environment).

In various examples, output data associated with the model component 104, can include indications of the areas or regions in the environment (e.g., the first area 204, the second area 206, and/or the third area 208), and can be transmitted to an autonomous vehicle that is configured to be controlled based at least in part on the indication.

In some examples, the intersection probabilities 106 output by the model component 104 can be used by the computing device 202 to test accuracy of determinations made by one or more components associated with the computing device 202 including, for example, the vehicle safety system. That is, the computing device 202 may, in some examples, compare stored data indicating actions by objects to intersection predictions made by the vehicle safety system (such as those based on using the intersection probabilities 106 as an input) to determine a level of performance for the vehicle safety system. In various examples, the intersection probabilities 106 can be used by the computing device 202 to ascertain performance of outputs (e.g., predictions, determinations, etc.) from the perception component 522 and/or the planning component 524. As a non-limiting example, various simulations may be generated in accordance with the distribution and a system of the vehicle in simulation may be tested to determine if the vehicle would be able to safely handle the object instantiated with particular initial conditions.

In some examples, the computing device 202 can receive driving data associated with a real-world environment, and determine a distribution of discrete points of initial condition associated with the plurality of object states over the driving data. The computing device 202 can also or instead determine, based at least in part on the distribution, a potential collision between the object and the vehicle in the real-world environment.

The one or more areas (e.g., areas 204, 206, and/or 208) may, in some examples, comprise or represent a corridor associated with a safety margin. For instance, the computing device 202 may determine a drivable surface, determine a corridor (or region), detect objects, and/or fuse the objects into the corridor. In such an example, a safety margin (or safety region) for the vehicle 102 can be created during fusion of the detected objects into the corridor. In some examples, the computing device 202 may determine a safety margin for the trajectory 302 and/or the trajectory 304.

Additional details of determining a corridor for an autonomous vehicle are described in U.S. patent application Ser. No. 15/982,694, filed May 17, 2018, entitled "Drive Envelope Determination," which is incorporated herein by reference. Additional details of determining a drivable area for an autonomous vehicle are described in U.S. patent application Ser. No. 16/181,164, filed Nov. 5, 2018, entitled "Vehicle Trajectory Modification For Following," which is incorporated herein by reference.

Figure 3:
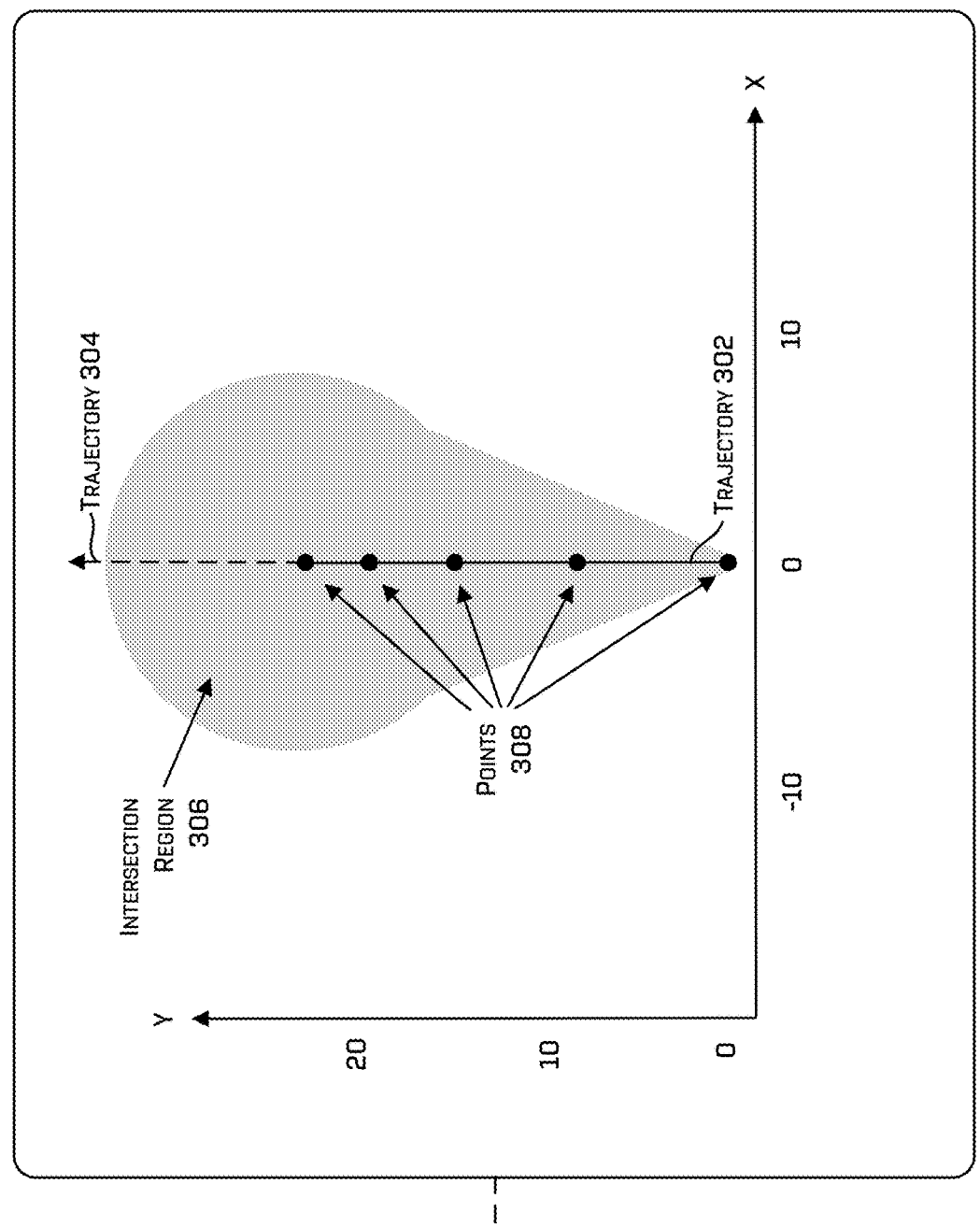
FIG. 3 is an illustration of an example implementation to determine object state(s) that cause an object to intersect with a vehicle, and actions the vehicle may take to avoid the intersection.

FIG. 3 is an illustration of an example implementation 300 to determine object state(s) that cause an object to intersect with a vehicle, and actions the vehicle may take to avoid the intersection. For instance, a computing device 202 (e.g., vehicle computing device 504 and/or the computing device(s) 550) and/or a vehicle safety system (e.g., vehicle safety system 534) may implement the model component 104 to determine intersection probabilities (intersection probabilities 106) between a vehicle (vehicle 102) and an object (object 108).

As illustrated in FIG. 3, a vehicle can traverse an environment over a period of time according to a trajectory 302 and a trajectory 304. In some examples, the trajectory 304 may represent a maximum deceleration along the trajectory, while in some examples, the trajectory 304 may represent a trajectory for a vehicle to follow to reach a destination in an environment.

The intersection region 306 can represent an area defined by the model component 104, such as an area in which an intersection with the object is inevitable according to the input data unless the vehicle 102 take an action to avoid the object. Points 308 along the trajectory 302 indicate points in time that the vehicle may run an instance of the vehicle safety system and/or make a prediction such as to turn, change acceleration, and/or brake sufficiently to avoid the object. Generally, the trajectory 302 and/or the trajectory 304 may be associated with any number of points 308 at which the vehicle 102 determines whether to speed up, slow down, turn sharply, and may change acceleration, steering, and/or braking thresholds to enable using full braking capacity (e.g., brakes can be applied as needed to avoid an intersection absent consideration to rider comfort).

In some examples, the computing device 202 can implement the trajectory 304 for the vehicle to follow upon detecting a point (e.g., an intersection point such as the intersection point 114) in the intersection region 306 at which different acceleration, steering, and/or braking actions by the vehicle 102 are more likely to cause the vehicle 102 to avoid the object (versus actions associated with the trajectory 302). For instance, the trajectory 304 may enable greater positive acceleration versus the trajectory 302 to avoid an object in the intersection region 306.

In some examples, the model component 104 may determine the intersection probabilities and/or define areas based at least in part on algorithms related to dynamics, kinematics, motion, geometry, and physics (e.g., for two-dimensions and/or three-dimensions, for rigid and/or non-rigid bodies, and the like).

In some examples, the vehicle safety system of the vehicle 102 may determine the intersection region 306 based at least in part on one or more of: one or more intersection points, one or more intersection times, a minimum velocity (or a minimum time) for the object to be in the intersection region 306, and/or a maximum velocity (or maximum time) for the object to be in the intersection region 306. Determining an intersection probability between the vehicle 102 and the object may comprise, in some examples, determining that a current velocity of the object is between the minimum velocity for the object to be in the intersection region 306 and the maximum velocity for the object to be in the intersection region 306. The minimum time for the object to be in the intersection region 306 and/or the maximum time for the object to be in the intersection region 306 may also or instead be considered during intersection probability determination.

In some examples, the intersection region 306 can be determined based at least in part on an adversarial behavior of a potential object (e.g., a worst-case aggressive behavior such as turning sharply towards the vehicle). For instance, the model component 104 may determine a plurality of object states based at least in part on an adversarial behavior associated with the object, and define the intersection region 306 based on plurality of object states.

Figure 4:
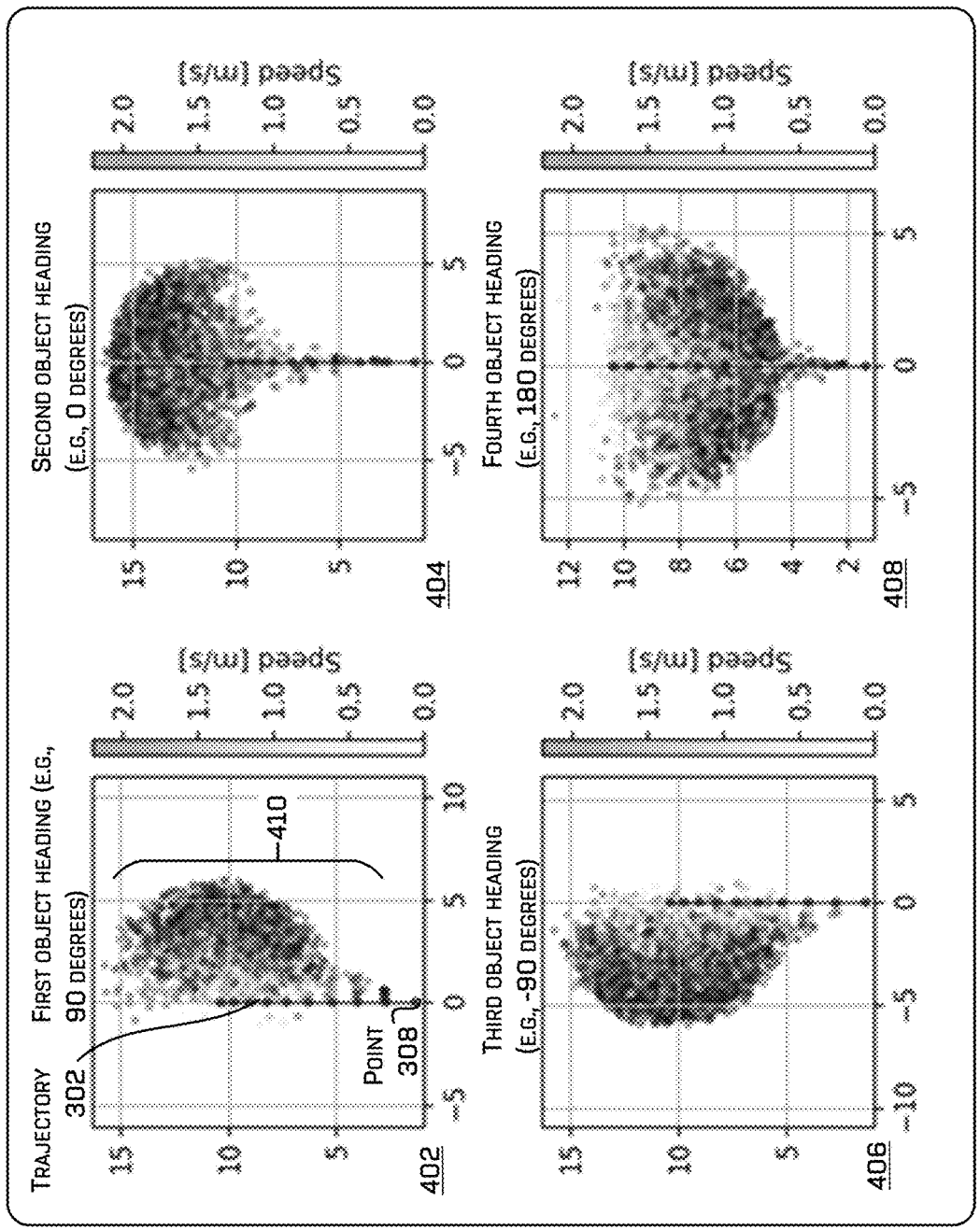
FIG. 4 is an illustration of an example implementation, in which one or more models determine intersect probabilities indicating a likelihood for one or more example objects to collide with an example vehicle.
Figure 4:
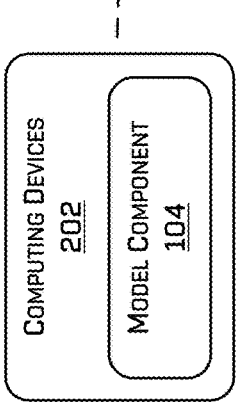

FIG. 4 is an illustration of an example implementation 400, in which one or more models determine intersect probabilities indicating a likelihood for one or more example objects to collide with an example vehicle. For instance, a computing device 202 (e.g., vehicle computing device 504 and/or the computing device(s) 550) and/or a vehicle safety system (e.g., vehicle safety system 534) may implement the model component 104 to determine intersection probabilities (intersection probabilities 106) between a vehicle (vehicle 102) and an object (object 108).

FIG. 4 depicts the computing device 202 implementing the model component 104 to determine representations (e.g., representation 402, representation 404, representation 406, and representation 408) of intersection probabilities 410 for different object state data. For ease of discussion, the intersection probabilities 410 are shown relative to the representation 402 which includes the trajectory 302 of the vehicle 102 and points 308.

As shown in FIG. 4, the representation 402 can indicate the intersection probabilities 410 for an object having varied heading, velocity, and evasiveness according to data input into the model component 104. For example, the representation 402 illustrates positions and velocities of an object in an environment from which it can collide with the vehicle 102. Representation 402 further illustrates such objects with an initial heading of 90 degrees relative to the vehicle, meaning heading in an opposite direction of the vehicle. In various examples, different positions and velocities can be plotted to represent different potential intersection scenarios. In some examples, the intersection probabilities 410 can represent hypothetical objects that can collide with the vehicle even if the vehicle implements a trajectory to decelerate and/or brake.

In some examples, the representation 404 illustrates objects with an initial heading of 0 degrees relative to the vehicle, the representation 406 illustrates objects with an initial heading of −90 degrees relative to the vehicle, and representation 408 illustrates objects with an initial heading of 180 degrees relative to the vehicle. In this way, the representation 402, the representation 404, the representation 406, and the representation 408 can represent intersection probabilities 410 for different object state data associated with objects located in any direction surrounding the vehicle.

In some examples, the shading in FIG. 4 can correspond to different initial velocities of the object. For instance, darker shading can represent a higher initial velocity than lighter shading. Accordingly, the representation 402 shows darker shading further from the trajectory 302 and lighter shading closer to the trajectory 302 to indicate the relative velocities for the potential object to collide with the vehicle along the trajectory 302 in the future. In various examples, the representations can represent the intersection probabilities 410 for an object associated with different velocities at different locations. The representation 402 may, for instance, capture a range of initial velocities of a possible object.

In some examples, the representations can reflect different orientations of objects relative to the vehicle (or the trajectory 302). For instance, the intersection probabilities 410 associated with each of the representations can be associated with different potential object orientations, or headings, to account for possible actions the object may take in the future.

In various examples, the representations can illustrate or represent an adversarial object (e.g., an object having adversarial behavior). For example, based at least in part on an object parameter used as input data to the model component 104, the representations can represent worst case scenarios possible with a potential object. The object parameters can, in some examples, be based at least in part on log data of objects. That is, log data describing previous behavior of objects (according to object type, object size, etc.) can be used to determine an evasiveness parameter and/or an aggressiveness parameter for an object. In some instances, the object parameter can be determined based at least in part on a position of an object relative to an area or region defined by the model component 104.

In some examples, a vehicle computing device and/or a vehicle safety system of the vehicle may send information indicative of the intersection values 426 to another component, such as the planning component 524 for use in planning operations (e.g., to determine a trajectory for the vehicle 102 to avoid the object) and/or a perception component 522 to modify downstream processing of the object. In this way, outputs by the model may be used to safely control the vehicle to a destination in the environment.

Figure 5:
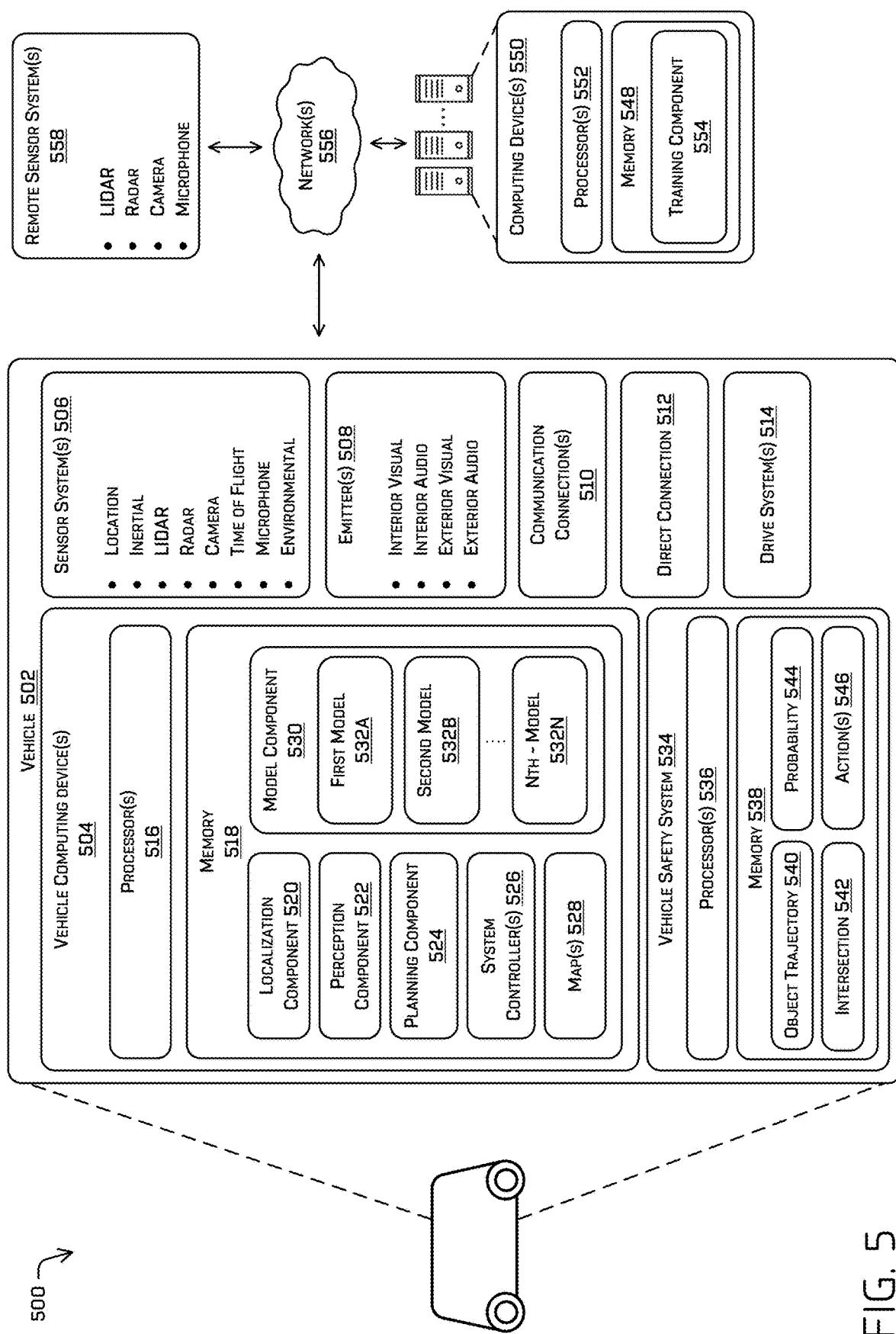
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

For the purpose of illustration, the vehicle 502 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle 502 at any time. In such an example, since the vehicle 502 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 502 are described below.

The vehicle 502 may include a vehicle computing device 504 (also referred to as a vehicle computing device 504 or vehicle computing device(s) 504), one or more sensor systems 506, one or more emitters 508, one or more communication connections 510, at least one direct connection 512, and one or more drive systems 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device 504 stores a localization component 520, a perception component 522, a planning component 524, one or more system controllers 526, one or more maps 528, and a model component 530 including one or more models, such as a first model 532A, a second model 532B, up to an Nth model 532N (collectively "models 532"), where N is an integer greater than 1. Though depicted in FIG. 5 as residing in the memory 518 for illustrative purposes, it is contemplated that the localization component 520, the perception component 522, the planning component 524, the one or more system controllers 526, the one or more maps 528, and/or the model component 530 including the models 532 may additionally, or alternatively, be accessible to the vehicle 502 (e.g., stored on, or otherwise accessible by, memory remote from the vehicle 502, such as, for example, on memory 548 of a remote computing device 550).

Additionally, vehicle 502 may include a vehicle safety system 534, including an object trajectory component 540, an intersection component 542, a probability component 544, and an action component 546. As shown in this example, the vehicle safety system 534 may be implemented separately from the vehicle computing device(s) 504, for example, for improved performance of the vehicle safety system, and/or to provide redundancy, error checking, and/or validation of determinations and/or commands determined by the vehicle computing device(s) 504. However, in other examples, the vehicle safety system 534 may be implemented as one or more components within the same vehicle computing device(s) 504.

By way of example, the vehicle computing device(s) 504 may be considered to be a primary system, while the vehicle safety system 534 may be considered to be a secondary system. The primary system may generally perform processing to control how the vehicle maneuvers within an environment. The primary system may implement various artificial intelligence (AI) techniques, such as machine learning, to understand an environment around the vehicle 502 and/or instruct the vehicle 502 to move within the environment. For example, the primary system may implement the AI techniques to localize the vehicle, detect objects around the vehicle, segment sensor data, determine classifications of the objects, predict object tracks, generate trajectories for the vehicle 502 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 506.

In some examples, the vehicle safety system 534 may operate as separate system that receives state data (e.g., perception data) based on the sensor data and AI techniques implemented by the primary system (e.g., vehicle computing device(s) 504), and may perform various techniques described herein for improving collision prediction and avoidance by the vehicle 502. As described herein, the vehicle safety system 534 may implement techniques for predicting intersections/collisions based on sensor data, as well as probabilistic techniques that are based on positioning, velocity, acceleration, etc. of the vehicle and/or objects around the vehicle. In some examples, the vehicle safety system 534 may process data from sensors, such as a subset of sensor data that is processed by the primary system. To illustrate, the primary system may process lidar data, radar data, image data, depth data, etc., while the vehicle safety system 534 may process just lidar data and/or radar data (and/or time of flight data). In other examples, however, the vehicle safety system 534 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference for all purposes.

Although depicted in FIG. 5 as residing in the memory 518 for illustrative purposes, it is contemplated that the localization component 520, the perception component 522, the planning component 524, the model component 530, the system controller(s) 526, and the maps 528 may additionally, or alternatively, be accessible to the vehicle 502 (e.g., stored on, or otherwise accessible by, memory remote from the vehicle 502, such as, for example, on memory 548 of a remote computing device 550). Similarly, the although the object trajectory component 540, intersection component 542, probability component 544, and/or action component 546 are depicted as residing in the memory 538 of the vehicle safety system 534, one or more of these components may additionally, or alternatively, be implemented within vehicle computing device(s) 504 or may be accessible to the vehicle 502 (e.g., stored on, or otherwise accessible by, memory remote from the vehicle 502, such as, for example, on memory 548 of a remote computing device 550).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 528, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect or determine gravity, detect objects in an environment, generate routes, determine actions and/or trajectories to navigate within an environment.

In some examples, the one or more maps 528 may be stored on a remote computing device(s) (such as the computing device(s) 550) accessible via network(s) 556. In some examples, multiple maps 528 may be stored based on, for example, a characteristic (e.g., type of entity, time of day, day of week, season of the year, etc.). Storing multiple maps 528 may have similar memory requirements, but increase the speed at which data in a map may be accessed.

As illustrated in FIG. 5, the vehicle computing device 504 may include a model component 530. The model component 530 may be configured to determine intersection probabilities between an object an the vehicle 502 in an environment. In various examples, the model component 530 may receive sensor data associated with an object from the localization component 520, the perception component 522, and/or from the sensor system(s) 506. In some examples, the model component 530 may receive map data from the localization component 520, the perception component 522, the map(s) 528, and/or the sensor system(s) 506. While shown separately in FIG. 5, the model component 530 could be part of the localization component 520, the perception component 522, the planning component 524, or other component(s) of the vehicle 502.

In various examples, the model component 530 may send output(s) from the first model 532A, the second model 532B, and/or the Nth model 532N may be used by the perception component 522 to alter or modify an action of the vehicle 502 such as an amount of perception performed in an area of the object based on an associated intersection probability. In some examples, the planning component 524 may determine one or more actions (e.g., reference actions and/or sub-actions) for the vehicle 502 based at least in part on output(s) from the model component 530. In some examples, the model component 530 may be configured to output information indicating a probability that an object is likely to cause a collision. In some examples, the model component 530 may include at least the functionality provided by the model component 104 of FIG. 1.

In some examples, the model component 530 may communicate an output to the perception component 522 to cause an update to one or more parameters (e.g., bias values, drift values, and the like) associated with the sensor system(s) 506.

In various examples, the model component 530 may utilize machine learning techniques to determine an intersection value, as described with respect to FIG. 1 and elsewhere. In such examples, machine learning algorithms may be trained to predict a probability of an intersection while improving accuracy of the prediction.

The vehicle safety system 534 may include an object trajectory component 540 configured to determine or receive a trajectory for the vehicle 502 and/or trajectories for other objects identifying within an environment, using the various systems and techniques described herein. In some examples, the object trajectory component 540 may receive planning data, perception data, and/or map data from the components 520-526 to determine a planned trajectory for the vehicle 502 and trajectories for the other objects in the environment.

In various examples, the object trajectory component 540 may generate a set of single points and/or pairs of related points (e.g., for a path polygon) representing a trajectory. In some examples the pairs of points and/or single points for a single trajectory may be at consistent intervals (e.g., 0.2 second intervals, 0.5 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a vehicle/object maneuvers, speeds, density of traffic in the environment, and/or other factors impacting the vehicle 502 or object for which the trajectory is determined.

In some examples, the object trajectory component 540 determine a single planned trajectory for the vehicle 502 (e.g., based on planning data and map data received from the planning component 524 and map(s) 528), and may determine multiple trajectories for one or more other moving objects (e.g., object 108) in the environment in which the vehicle 502 is operating. In some examples, the trajectories of another object may include any number of possible paths in which the object may travel from a current position (e.g., at the time of perception) and/or based on a direction of travel. Based on the determination that the agent is within the threshold distance or time to the vehicle 502, the object trajectory component 540 may determine the trajectories associated with the object. In some examples, the object trajectory component 540 may be configured to determine the possible trajectories of each detected moving object in the environment.

In various examples, the intersection component 542 may use the various techniques described herein to determine intersections between the trajectory of the vehicle 502 and/or one or more of the trajectories for other objects in the environment, to determine whether a potential collision zone may exist in the environment. A potential collision zone may include an area in which, based on the path polygon(s) and/or the trajectories, an intersection may occur between the vehicle 502 and an object (e.g., object 108). In at least some examples, a trajectory for the object and object attributes (e.g., object size, position, orientation, pose, etc.) may be used to calculate an object polygon for the object. In such examples, a collision zone may be defined by the overlapping area between the path polygon for the vehicle 502 and the object polygon for the other object.

In some examples, the potential collision zone may exist between the vehicle 502 and the object if the trajectory associated with the vehicle 502 intersects with at least one trajectory associated with the object. In various examples, the intersection component 542 may determine that the potential collision zone may exist between the vehicle 502 and the object based on the vehicle and object trajectories being within a threshold distance (e.g., 2 feet, 3 feet, 4 meters, 5 meters, etc.). In some examples, the threshold distance may be based on a pre-defined distance. In various examples, the threshold distance may be determined based on a known or perceived width of the vehicle and/or of the object. In some examples, the threshold distance may be determined further a buffer, which may represent a safety buffer around the vehicle 502 and/or the object.

In some examples, the intersection component 542 may expand the edges of the vehicle trajectory and/or trajectories for the object, from the center of the vehicle 502 and object respectively, based on the known or perceived width of the vehicle and object. If the expanded width of the vehicle trajectory (or path polygon) and object trajectory (or path polygon) intersects and/or pass within a minimum allowable distance (e.g., 3 inches, 5 inches, 1 feet), the intersection component 542 may determine that the potential collision zone exists. If the expanded width of the vehicle trajectories and/or path polygons do not intersect and/or pass by more than the minimum allowable distance, the intersection component 542 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a potential collision zone may exist, the intersection component 542 may be configured to determine the bounds of the potential collision zone. In some examples, the potential collision zone may include four elements, a vehicle enter point, a vehicle exit point, an object enter point, and an object exit point. Each of the vehicle 502 and object enter and exit points may include a position and distance. The object entry point and object exit point may include trajectory samples, such as trajectory samples, along the trajectory of the object. In some examples, object entry point and agent exit point may represent trajectory samples in which a risk of collision does not exist. In various examples, an object enter point position may be determined by identifying the last trajectory sample associated with the trajectory of the object prior to an intersection (e.g., convergence) with the trajectory or path polygon for the vehicle 502. In some examples, an object exit point position may be determined by identifying the first trajectory sample associated with the object trajectory after the convergence between the trajectory of the object and the trajectory or path polygon of the vehicle 502. The distance associated with object enter point and the object exit point may be derived from the respective positions as a distance along the trajectory.

In some examples, the intersection component 542 may be configured to determine or define an area or region (e.g., a region in which an object may impact the vehicle by causing a collision), based at least in part on whether an object is adversarial or evasive. For example, the intersection component 542 can sample along distributions of possible object behaviors for an object with particular initial conditions (e.g., initial position, heading, velocity, etc.) and determine, given the initial conditions and based on the sampled behavior of the object, whether a collision will occur. by sampling distributions as described herein, the intersection component 542 can determine a probability of collision associated with observing an object with particular initial conditions in an environment.

In various examples, the intersection component 542 can determine different regions with different probabilities of collision based at least in part on probabilities associated with a "heat map". For examples, regions of the environment can be associated with a heat map in which cells of the heat map indicative probabilities of collision between an object and the vehicle. The intersection component 542 may determine vehicle enter point and vehicle exit point positions based on an offset distance before and after the vehicle trajectory or path polygon. In some examples, the offset distance may include a distance measured perpendicular to the trajectory of the vehicle 502. In some examples, the offset distance may include a distance measured along the path polygon (e.g., vehicle path) before and after the trajectory. In various examples, the offset distance may be measured from the center of the path polygon. In some examples, the offset distance may be measured from a forward most point of the vehicle along the path polygon. In such examples, the offset distance may account for vehicle maneuvers (e.g., turns) and an affect thereof on a position of the vehicle 502.

As discussed above, in various examples the intersection component 542 may perform time-space overlap analysis on one or more potential collision zones (bounds thereof, such as the vehicle and object enter and exit points). In various examples, the time-space overlap may be represented as position cones associated with predicted object trajectories and the planned trajectory of the vehicle 502. In various examples, the intersection component 542 may be configured to determine a vehicle position cone and an agent position cone. The vehicle position cone may be determined based on probable velocities of the vehicle 502 along the planned trajectory (e.g., path polygon) through the potential collision zone. The object position cone may be determined based on probable velocities of the agent along the trajectory for the object associated with the potential collision zone.

In various examples, the probable velocities of the object may be derived from probable accelerations (e.g., positive and negative accelerations) of the intersection component 542. The accelerations may include positive accelerations based on a fast-behavioral model (e.g., aggressive behavior) and negative accelerations based on a slow-behavioral model (e.g., conservative behavior). In various examples, the positive accelerations associated with the object may be based on traffic laws, rules of the road, local driving etiquette, traffic patterns, semantic classification of the agent, or the like. In some examples, the positive accelerations may represent a maximum amount of positive acceleration probable in the environment based on an initial velocity. In various examples, the negative accelerations associated with the object may represent a maximum amount of negative acceleration probable in the environment, such as that based on the initial velocity of the object.

In various examples, intersection component 542 may determine position lines and/or position cones for the object and the vehicle 502 respective to the potential collision zone. The position lines and/or cones for the vehicle 502 and the object may be based on the object entry time, object exit time, vehicle entry time, and vehicle exit time with respect to the potential collision zone. In such examples, the entry times into the potential collision zone may be associated with a most aggressive estimation of speed. In various examples, the object exit time and the vehicle exit time may be associated with respective minimum velocities. In such examples, the exit times into the potential collision zone may be associated with a most conservative estimation of speed.

In some examples, the time-space overlap may be represented as one or more probability density functions associated with probable positions of the object based on time. The probable positions of the object may be derived from probable accelerations, and speeds derived therefrom and/or outputs of other systems or subsystems (e.g., a prediction system, which may be, for example, a subsystem of the perception component 522). The probability density functions may represent aggressive and conservative driving speeds, as well as uncertainties based on accelerations of the object, such as those based on traffic laws, rules of the road, local driving etiquette, traffic patterns, semantic classification of the agent, or the like. The probability density functions may represent two-dimensional area or three-dimensional areas associated with the object. The total sum of the area under a curve of a probability density function may equal 1.

In various examples, probability component 544 may determine a prediction of an intersection between the vehicle 502 and/or the other object (e.g., object 108) and/or a probability/risk of collision, based on the time-space overlap analyses performed by the intersection component 542. In some examples, the probability component 544 may determine a probability of an intersection based on a single trajectory of the vehicle 502 and a single trajectory of the object, based on an overlap between position lines and/or position cones of the vehicle 502 and object with respect to the potential collision zone. For instance, based on where in the potential collision zone that the position lines overlap, and/or the amount of overlap between the position cones (e.g., the time gap, percentage of cone overlap, etc.), the probability component 544 may determine that a risk of collision may be relatively high, medium, or low.

Additionally, using the various techniques described herein, the probability component 544 also may determine a probability of an intersection between the vehicle 502 and an object, based on the planned trajectory of the vehicle 502 and multiple trajectories of the object. For example, the intersection component 542 may analyze multiple trajectories of the object (e.g., based on perturbations of the object state parameters), and the probability component 544 may determine a single intersection prediction based on the results of the analyses the multiple trajectories. In some cases, the probability component 544 may determine an intersection probability based on the percentage (or ratio) of trajectories for the object that are determined to intersect or collide with the vehicle 502 based on the planned vehicle trajectory.

In various examples, the action component 546 may determine one or more actions for the vehicle 502 to take, based on predictions and/or probability determinations of an intersection between the vehicle 502 another object (e.g., object 108), along with other factors. The action may include slowing the vehicle to yield to the object, stopping the vehicle to yield to the object, changing lanes or swerving left, or changing or swerving lanes right, etc. Based on the determined action, the vehicle computing device(s) 504, such as through the system controller(s) 526, may cause the vehicle 502 to perform the action. In at least some examples, such an action may be based on the probability of collision, determined by the probability component 544 based on multiple trajectories for the object, as described in detail. In various examples, responsive to determining to adjust a lateral position of the vehicle, such as in a lane change to the left or to the right, the vehicle safety system 534 may cause the components 540-546 to generate an updated vehicle trajectory (or path polygon), plot additional object trajectories with respect to the updated vehicle trajectory, determine updated potential collision zones, and perform time-space overlap analyses to determine whether an intersection risk may still exist after the determined action is performed by the vehicle 502.

As can be understood, the components discussed herein (e.g., the localization component 520, the perception component 522, the planning component 524, the one or more system controllers 526, the one or more maps 528, and the vehicle safety system 534 including the object trajectory component 540, the intersection component 542, the probability component 544, and the action component 546 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 518 (and the memory 548, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 556, to the one or more computing device(s) 550 at a particular frequency, after a lapse of a predetermined period of time, in near real-time, etc. In some examples, the model component 530 may receive sensor data from one or more of the sensor system(s) 506.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 550, other nearby vehicles, etc.) and/or one or more remote sensor system(s) 558 for receiving sensor data. The communication connection(s) 510 also enable the vehicle 502 to communicate with a remote teleoperations computing device or other remote services.

The communication connection(s) 510 may include physical and/or logical interfaces for connecting the vehicle computing device 504 to another computing device or a network, such as network(s) 556. For example, the communication connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 556, to the computing device(s) 550. In at least one example, the localization component 520, the perception component 522, the planning component 524, the one or more system controllers 526, the one or more maps 528, and the model component 530 may send their respective outputs to the remote computing device(s) 550 at a particular frequency, after a lapse of a predetermined period of time, in near real-time, etc.

In some examples, the vehicle 502 may send sensor data to the computing device(s) 550 via the network(s) 556. In some examples, the vehicle 502 may receive sensor data from the computing device(s) 550 and/or remote sensor system(s) 558 via the network(s) 556. The sensor data may include raw sensor data and/or processed sensor data and/or representations of sensor data. In some examples, the sensor data (raw or processed) may be sent and/or received as one or more log files.

The computing device(s) 550 may include processor(s) 552 and a memory 548 storing a training component 554.

In some instances, the training component 554 can include functionality to train a machine learning model to output classification values (e.g., intersection probabilities). For example, the training component 554 can receive data that represents labelled collision data (e.g. publicly available data, sensor data, and/or a combination thereof). At least a portion of the data can be used as an input to train a machine learned model. As a non-limiting example, sensor data, audio data, image data, map data, inertia data, vehicle state data, historical data (log data), or a combination thereof may be input into the machine learned model. Thus, by providing data where the vehicle traverses an environment, the training component 554 can be trained to output intersection values associated with objects, as discussed herein.

In some examples, the training component 554 can include training data that has been generated by a simulator. For example, simulated training data can represent examples where a vehicle collides with an object in an environment or nearly collides with an object in an environment, to provide additional training examples.

In some examples, functionality provided by the training component 554 may be included and/or performed by the vehicle computing device 504.

The processor(s) 516 of the vehicle 502, processor(s) 536 of the vehicle safety system 534, and/or the processor(s) 552 of the computing device(s) 550 may be any suitable processor capable of executing instructions to process data and perform operations as described herein. By way of example and not limitation, the processor(s) 516, 536, and 552 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518, memory 538, and memory 548 are examples of non-transitory computer-readable media. The memory 518, the memory 538, and/or memory 548 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518, the memory 538, and memory 548 may include at least a working memory and a storage memory. For example, the working memory may be a high-speed memory of limited capacity (e.g., cache memory) that is used for storing data to be operated on by the processor(s) 516, 536, and/or 552. In some instances, the memory 518, the memory 538, and memory 548 may include a storage memory that may be a lower-speed memory of relatively large capacity that is used for long-term storage of data. In some cases, the processor(s) 516, 536, and/or 552 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 550 and/or components of the computing device(s) 550 may be associated with the vehicle 502. That is, the vehicle 502 may perform one or more of the functions associated with the computing device(s) 550, and vice versa. For instance, either the vehicle 502 and/or the computing device(s) 550 may perform training operations relating to one or more of the models described herein.

Figure 6:
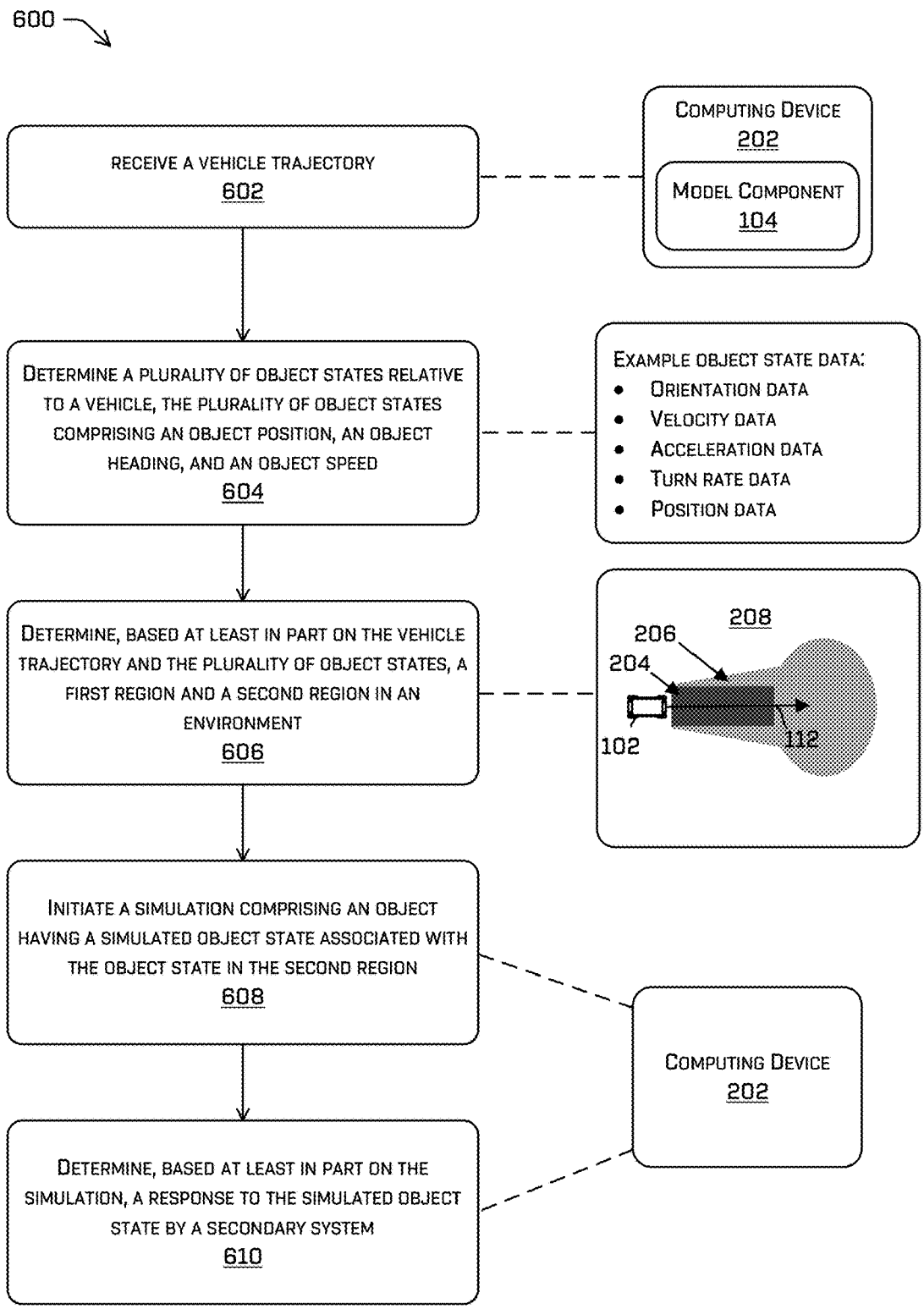
FIG. 6 is a flowchart depicting an example process for determining probability of intersection using one or more example models.

FIG. 6 is a flowchart depicting an example process 600 for determining probability of collision using one or more example models. Some or all of the process 600 may be performed by one or more components in FIG. 5, as described herein. For example, some or all of process 600 may be performed by the vehicle computing device 504, the computing device(s) 550, and/or the vehicle safety system 534.

At operation 602, the process may include receiving a vehicle trajectory. In some examples, the operation 602 may include the model component 104 receiving a planned trajectory (e.g., the trajectory 112, the trajectory 302, and/or the trajectory 304) from a planning component 524.

At operation 604, the process may include determining a plurality of object states relative to a vehicle, the plurality of object states comprising an object position, an object heading, an object velocity or speed, or any other parameter to describe a state of the object. For instance, the plurality of object states can be associated with object state data. The object state data can comprise one or more of orientation data, heading data, speed data, velocity data, acceleration data, turn rate data, position data, and so on. In one specific example, the object data can comprise a position of the object, an orientation of the object, and a velocity of the object. In some examples, determining the object state data based at least in part on input from a user interface, a machine learned model, or a combination thereof. The object state data may be determined based at least in part on sensor data associated with one or more objects in an environment of the vehicle 102. The one or more objects may represent a pedestrian, a group of pedestrians, another vehicle, and so on. The vehicle computing device may detect, infer, estimate, or otherwise determine state data representing characteristics of the object and/or the vehicle in the environment based at least in part on the sensor data.

At operation 606, the process may include determining, based at least in part on the vehicle trajectory and the plurality of object states, a first region and a second region in an environment. In some examples, the operation 606 may include the model component 104 associating, receiving, or otherwise determining one or more regions or areas having different collision probabilities (e.g., the first area 204, the second area 206, and/or the third area 208). In some examples, the object state data can be sampled from the regions that we precompute. In some examples, the first region may represent a region in which the vehicle is unable to avoid a collision. In various examples, the second region may represent a region in which a probability of collision is greater than or equal to a threshold probability, and exclusive of the first region.

In some examples, the operation 606 may include identifying or determining the first region or the second region based at least in part on the evasiveness parameter and/or the aggressiveness parameter (e.g., with input from a user interface, a machine learned model, or a combination thereof). Further description of object parameters are discussed throughout this disclosure. The input data can comprise the trajectory, the plurality of object states, and object behavior as input data to represent, in various examples, scenarios that a vehicle safety system may encounter during modeling and/or during operation on the vehicle 502.

At operation 608, the process may include initiating a simulation comprising an object having a simulated object state associated with the object state in the second region. In some examples, the operation 608 may include the model component 104 providing output data to cause a simulation to run on a secondary system, such as a vehicle safety system. In some instances, the model component 104 can communicate the output data to the vehicle safety system.

At operation 610, the process may include determining, based at least in part on the simulation, a response to the simulated object state by a secondary system. In some examples, the operation 610 may include validating, based at least in part on the comparison, a prediction associated with the vehicle safety system. In some examples, the operation 610 may include implementing a computing device to determine a level of performance for the vehicle safety system. In some examples, validating a secondary system such as the vehicle safety system can include causing the vehicle to take an action, such as an acceleration action or a braking action. In some examples, validating the prediction associated with the vehicle safety system can include validating whether a trajectory received from a planning component of the vehicle computing device.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving a vehicle trajectory; determining a plurality of object states relative to a vehicle, the plurality of object states comprising an object position, an object heading, and an object speed; determining, based at least in part on the vehicle trajectory and the plurality of object states, a first region and a second region in an environment; initiating a simulation comprising an object having a simulated object state associated with the object state in the second region; and determining, based at least in part on the simulation, a response to the simulated object state by a secondary system, wherein the first region comprises a region in which the vehicle is unable to avoid a collision and the second region comprises a region in which a probability of collision is greater than or equal to a threshold probability and exclusive of the first region.

B: A system as paragraph A describes, the operations further comprising: determining the plurality of object states based at least in part on an adversarial behavior associated with the object.

C: A system as paragraphs A or B describe, the operations further comprising: determining the second region based at least in part on an evasiveness parameter or an aggressiveness parameter associated with the object, the evasiveness parameter representing a likelihood for the object to perform an action to decrease a possible collision associated with the vehicle, and the aggressiveness parameter representing a likelihood for the object to perform an action to increase a possible collision associated with the vehicle.

D: A system as paragraphs A-C describe, the operations further comprising: receiving driving data associated with a real-world environment; determining a distribution of discrete points of initial conditions associated with the plurality of object states over the driving data; and determining, based at least in part on the distribution, the second region.

E: A system as paragraphs A-D describe, wherein determining the response to the simulated object state by the secondary system comprises one or more of: determining an intersection probability between the object and the vehicle at a future time; or initiating a braking action to cause the vehicle to stop.

F: A method comprising: receiving a vehicle trajectory; determining a plurality of object states relative to a vehicle, the plurality of object states comprising an object position, an object heading, and an object speed; determining, based at least in part on a vehicle trajectory and the plurality of object states, a first region and a second region in an environment; initiating a simulation comprising an object having a simulated object state associated with the object state in the second region; and determining, based at least in part on the simulation, a response to the simulated object state by a secondary system.

G: A method as paragraph F describes, wherein: the plurality of object states relative to the vehicle further comprises an acceleration or a turning rate associated with the object; the first region represents a first area in the environment where the object is unable to avoid collision with the vehicle; and the second region represents a second area in the environment that is associated with a likelihood that the object collides with the vehicle.

H: A method as paragraphs F or G describe, further comprising: determining the plurality of object states based at least in part on an adversarial behavior associated with the object.

I: A method as paragraphs F-H describe, further comprising: determining the second region based at least in part on an evasiveness parameter or an aggressiveness parameter associated with the object, the evasiveness parameter representing a likelihood for the object to perform an action to decrease a possible collision associated with the vehicle, and the aggressiveness parameter representing a likelihood for the object to perform an action to increase a possible collision associated with the vehicle.

J: A method as paragraphs F-I describe, further comprising: receiving driving data associated with a real-world environment; determining a distribution of discrete points of initial conditions associated with the plurality of object states over the driving data; and determining, based at least in part on the distribution, the second region.

K: A method as paragraphs F-J describe, wherein: the secondary system is a vehicle safety system; and the plurality of object states relative to the vehicle comprises a range of object positions, a range of object headings, or a range of object velocities.

L: A method as paragraphs F-K describe, further comprising transmitting an indication of the first region and second region to an autonomous vehicle, the autonomous vehicle configured to be controlled based at least in part on the indication.

M: A method as paragraphs F-L describe, further comprising: determining predicted object state data that causes at least one of: the object to intersect with the vehicle or the object to avoid intersection with the vehicle, the predicted object state data comprising a change in the object speed or a change in the object heading between a first time and a second time; and validating, based at least in part on the predicted object state data, accuracy of the response to the simulated object state by the secondary system.

N: A method as paragraphs F-M describe, wherein the plurality of object states are relative to the vehicle trajectory.

O: A method as paragraphs F-N describe, wherein determining the plurality of object states relative to the vehicle is based at least in part on an object type associated with the object.

P: A method as paragraphs F-O describe, further comprising: defining an area in the environment where a potential intersection between the object and a safety region of the vehicle occurs at a second time; determining an object behavior that causes the object to intersect with the safety region; determining, based at least in part on the object behavior, a response to the simulated object state by the secondary system; and based at least in part on the response, validating the secondary system.

Q: One or more non-transitory computer-readable media storing instructions executable by a processor, wherein the instructions, when executed, cause the processor to perform operations comprising: receiving a vehicle trajectory; determining a plurality of object states relative to a vehicle, the plurality of object states comprising an object position, an object heading, and an object speed; determining, based at least in part on the vehicle trajectory and the plurality of object states, a first region and a second region in an environment; initiating a simulation comprising an object having a simulated object state associated with the object state in the second region; and determining, based at least in part on the simulation, a response to the simulated object state by a secondary system.

R: One or more non-transitory computer-readable media as paragraph Q describes, the operations further comprising: determining the plurality of object states based at least in part on an adversarial behavior associated with the object.

S: One or more non-transitory computer-readable media as paragraphs Q or R describe, the operations further comprising: determining the second region based at least in part on an evasiveness parameter or an aggressiveness parameter associated with the object, the evasiveness parameter representing a likelihood for the object to perform an action to decrease a possible collision associated with the vehicle, and the aggressiveness parameter representing a likelihood for the object to perform an action to increase a possible collision associated with the vehicle.

T: One or more non-transitory computer-readable media as paragraphs Q-S describe, the operations further comprising: receiving driving data associated with a real-world environment; determining a distribution of discrete points of initial conditions associated with the plurality of object states over the driving data; and determining, based at least in part on the distribution, the second region.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving a vehicle trajectory;
determining a plurality of object states relative to a vehicle, the plurality of object states comprising an object position, an object heading, and an object speed;
determining, based at least in part on the vehicle trajectory and the plurality of object states, a first region and a second region in an environment;
initiating, based at least in part on determining the first region and the second region, a simulation comprising an object having a simulated object state associated with the object state in the second region, the simulation exclusive of the first region; and
determining, based at least in part on the simulation, a response to the simulated object state by a secondary system,
wherein the first region comprises a region in which the vehicle is unable to avoid a collision and the second region comprises a region in which a probability of collision is greater than or equal to a threshold probability.

2. The system of claim 1, the operations further comprising:
determining the plurality of object states based at least in part on an adversarial behavior associated with the object.

3. The system of claim 1, the operations further comprising:
determining the second region based at least in part on an evasiveness parameter or an aggressiveness parameter associated with the object, the evasiveness parameter representing a likelihood for the object to perform an action to decrease a possible collision associated with the vehicle, and the aggressiveness parameter representing a likelihood for the object to perform an action to increase a possible collision associated with the vehicle.

4. The system of claim 1, the operations further comprising:
receiving driving data associated with a real-world environment;
determining a distribution of discrete points of initial conditions associated with the plurality of object states over the driving data; and
determining, based at least in part on the distribution, the second region.

5. The system of claim 1, wherein determining the response to the simulated object state by the secondary system comprises one or more of:
determining an intersection probability between the object and the vehicle at a future time; or
initiating a braking action to cause the vehicle to stop.

6. A method comprising:
receiving a vehicle trajectory;
determining a plurality of object states relative to a vehicle, the plurality of object states comprising an object position, an object heading, and an object speed;
determining, based at least in part on the vehicle trajectory and the plurality of object states, a first region and a second region in an environment, the first region associated with a first probability for a first object in the first region to impact operation of the vehicle and the second region associated with a second probability for a second object in the second region to impact operation of the vehicle;
initiating, based at least in part on the first probability and the second probability, a simulation between the vehicle and the second object in the second region, the second object having a simulated object state associated with one of the plurality of object states; and
determining, based at least in part on the simulation, a response to the simulated object state by a secondary system.

7. The method of claim 6, wherein:
the plurality of object states relative to the vehicle further comprises an acceleration or a turning rate associated with the object;
the first region represents a first area in the environment where the object is unable to avoid collision with the vehicle; and
the second region represents a second area in the environment that is associated with a likelihood that the object collides with the vehicle.

8. The method of claim 6, further comprising:
determining the plurality of object states based at least in part on an adversarial behavior associated with the object.

9. The method of claim 6, further comprising:
determining the second region based at least in part on an evasiveness parameter or an aggressiveness parameter associated with the object, the evasiveness parameter representing a likelihood for the object to perform an action to decrease a possible collision associated with the vehicle, and the aggressiveness parameter representing a likelihood for the object to perform an action to increase a possible collision associated with the vehicle.

10. The method of claim 6, further comprising:
receiving driving data associated with a real-world environment;
determining a distribution of discrete points of initial conditions associated with the plurality of object states over the driving data; and
determining, based at least in part on the distribution, the second region.

11. The method of claim 6, wherein:
the secondary system is a vehicle safety system; and
the plurality of object states relative to the vehicle comprises a range of object positions, a range of object headings, or a range of object velocities.

12. The method of claim 11, further comprising transmitting an indication of the first region and second region to an autonomous vehicle, the autonomous vehicle configured to be controlled based at least in part on the indication.

13. The method of claim 6, further comprising:
determining predicted object state data that causes at least one of: the object to intersect with the vehicle or the object to avoid intersection with the vehicle, the predicted object state data comprising a change in the object speed or a change in the object heading between a first time and a second time; and
validating, based at least in part on the predicted object state data, accuracy of the response to the simulated object state by the secondary system.

14. The method of claim 6, wherein the plurality of object states are relative to the vehicle trajectory.

15. The method of claim 6, wherein determining the plurality of object states relative to the vehicle is based at least in part on an object type associated with the object.

16. The method of claim 6, further comprising:
defining an area in the environment where a potential intersection between the object and a safety region of the vehicle occurs at a second time;
determining an object behavior that causes the object to intersect with the safety region;
determining, based at least in part on the object behavior, a response to the simulated object state by the secondary system; and
based at least in part on the response, validating the secondary system.

17. One or more non-transitory computer-readable media storing instructions executable by a processor, wherein the instructions, when executed, cause the processor to perform operations comprising:
receiving a vehicle trajectory;
determining a plurality of object states relative to a vehicle, the plurality of object states comprising an object position, an object heading, and an object speed;
determining, based at least in part on the vehicle trajectory and the plurality of object states, a first region and a second region in an environment, the first region associated with a first probability for a first object to impact operation of the vehicle and the second region being associated with a second probability for a second object to impact operation of the vehicle;
initiating, based at least in part on determining the first region and the second region, a simulation comprising the second object having a simulated object state associated with the object state in the second region, the simulation excluding the first region; and
determining, based at least in part on the simulation, a response to the simulated object state by a secondary system.

18. The one or more non-transitory computer-readable media of claim 17, the operations further comprising:

determining the plurality of object states based at least in part on an adversarial behavior associated with the object.

19. The one or more non-transitory computer-readable media of claim 17, the operations further comprising:
determining the second region based at least in part on an evasiveness parameter or an aggressiveness parameter associated with the object, the evasiveness parameter representing a likelihood for the object to perform an action to decrease a possible collision associated with the vehicle, and the aggressiveness parameter representing a likelihood for the object to perform an action to increase a possible collision associated with the vehicle.

20. The one or more non-transitory computer-readable media of claim 17, the operations further comprising:
receiving driving data associated with a real-world environment;
determining a distribution of discrete points of initial conditions associated with the plurality of object states over the driving data; and
determining, based at least in part on the distribution, the second region.

* * * * *